(12) United States Patent
Wang

(10) Patent No.: US 6,269,664 B1
(45) Date of Patent: Aug. 7, 2001

(54) ADJUSTMENT STRUCTURE OF PRESS RING AND STEEL RING FOR CIRCULAR KNITTING MACHINE

(75) Inventor: Ping-Shin Wang, Taipei Hsien (TW)

(73) Assignee: Pai Lung Machinery Mill Co., Ltd., Taipei Hsien (TW)

(*) Notice: Subject to any disclaimer, the term of this patent is extended or adjusted under 35 U.S.C. 154(b) by 0 days.

(21) Appl. No.: 09/767,912

(22) Filed: Jan. 24, 2001

(51) Int. Cl.$^7$ .................................................. D04B 9/00
(52) U.S. Cl. ......................................................... 66/8
(58) Field of Search .................. 66/7, 8, 56, 1 R; 344/615, 610, 609

(56) References Cited

U.S. PATENT DOCUMENTS

| | | | |
|---|---|---|---|
| 3,543,367 | * 12/1970 | Arnot | 66/8 |
| 4,489,573 | * 12/1984 | Engelfried et al. | 66/8 |
| 5,031,421 | * 7/1991 | Engelfried et al. | 66/8 |
| 5,134,863 | * 8/1992 | Hanna | 66/8 |
| 5,211,033 | * 5/1993 | Chen | 66/8 |
| 5,493,876 | * 2/1996 | Tsuchiya | 66/8 |

FOREIGN PATENT DOCUMENTS

| | | | |
|---|---|---|---|
| 2269845 | * 9/1990 | (JP) | 66/8 |
| 3906773 | * 9/1990 | (DE) | 66/8 |

* cited by examiner

*Primary Examiner*—Danny Worrell
(74) *Attorney, Agent, or Firm*—Bacon & Thomas, PLLC

(57) ABSTRACT

An improved structure of press ring and steel ring for adjusting steel ring wearing to enable a circular knitting machine to function normally. The transmission mechanism of the circular knitting machine includes a frame, a lower transmission gear, a steel ring set, a press ring, a needle drum seat and a spindle. The frame has an adjustment element located therein and a bulged ring at the outer side. The press ring is located above the bulged ring and with a washer interposed therebetween. The adjustment element may be unfastened to release pressing force of the press ring against the steel ring set for replacing the washer with a new and thinner washer, then the adjustment element may be fastened again to press the steel ring set to eliminate the gaps between the steel ring set and the frame, lower transmission gear and press ring whereby the spindle may drive the lower transmission gear smoothly for the circular knitting machine to operate normally.

2 Claims, 3 Drawing Sheets

ADJUSTMENT STRUCTURE OF PRESS RING AND STEEL RING FOR CIRCULAR KNITTING MACHINE

BACKGROUND OF THE INVENTION

This invention relates to an improvement for circular knitting machine and particularly a press ring adjustment structure for coupling with a steel ring set used in a circular knitting machine.

It is commonly known that when the transmission mechanism (shown in FIG. 1) of a conventional circular knitting machine does not run smoothly or becomes unstable in operation, or abnormal vibration or noise occurred during the circular knitting machine operation, the problems mainly result from the wearing steel ring set 3 (i.e. there are gaps between the steel ring 3 and the frame 1, lower transmission gear 2, and press ring 4). To remedy the problems, operator has to disassemble a lower diamond ring (not shown in the figure) and the needle drum seat 5, then unfasten an adjustment element 14, and remove the press ring 4 and the existing washer 44. Then the operator has to replace a thinner new washer 44 on a bulged ring 12 located in the frame 1, screw the press ring 4 over the bulged ring 12 to narrow the interval between the recess 45 and 15 of the press ring 4 and bulged ring 12 whereby to eliminate the gap between the steel ring set 3 and the recess 22 of the lower transmission gear 2. After all this has been done, the spindle (not shown in the figure) may drive the lower transmission gear 2 and needle drum seat 5 to operate smoothly without generating vibration or noise.

The foregoing adjustment needs to disassemble a lot of components for replacing the washer 44 and to assemble the components again. It takes a lot of time and work.

Moreover, the press ring 4, frame 1 and lower transmission gear 2 also need adjustments at the same time when adjusting the steel ring set 3 to an optimal operative condition and to enable the lower transmission gear 2 running at a normal state. This is also a tedious and time-consuming process.

SUMMARY OF THE INVENTION

In view of the foregoing disadvantages, it is therefore an object of this invention to provide a novel adjustment method that does not need to disassemble any component so that the steel ring set may be adjusted rapidly to restore the circular knitting machine to normal operation.

Another object of this invention is to provide an adjustment structure that needs only adjusting the press ring to achieve the result desired. It thus may save a lot of work and time.

In one aspect of this invention, the press ring is located above a bulged ring of the frame. After unfastening an adjustment element disposed in the frame, the pressing force of the press ring on the steel ring set will be released. Then the original washer may be removed for replacing a thinner washer between the press ring and bulged ring. Fasten the adjustment element again, a collar section of the press ring will press the steel ring set again so that there will be no gap between the steel ring set and the frame, lower transmission gear and press ring. Then the spindle may drive the lower transmission gear to enable the circular knitting machine function normally.

BRIEF DESCRIPTION OF THE DRAWINGS

The invention, as well as its many advantages, may be further understood by the following detailed description and drawings. The drawings are only to serve for reference and illustrative purpose, and do not intend to limit the scope of the present invention.

DESCRIPTION OF THE PREFERRED EMBODIMENT

Figure 1:
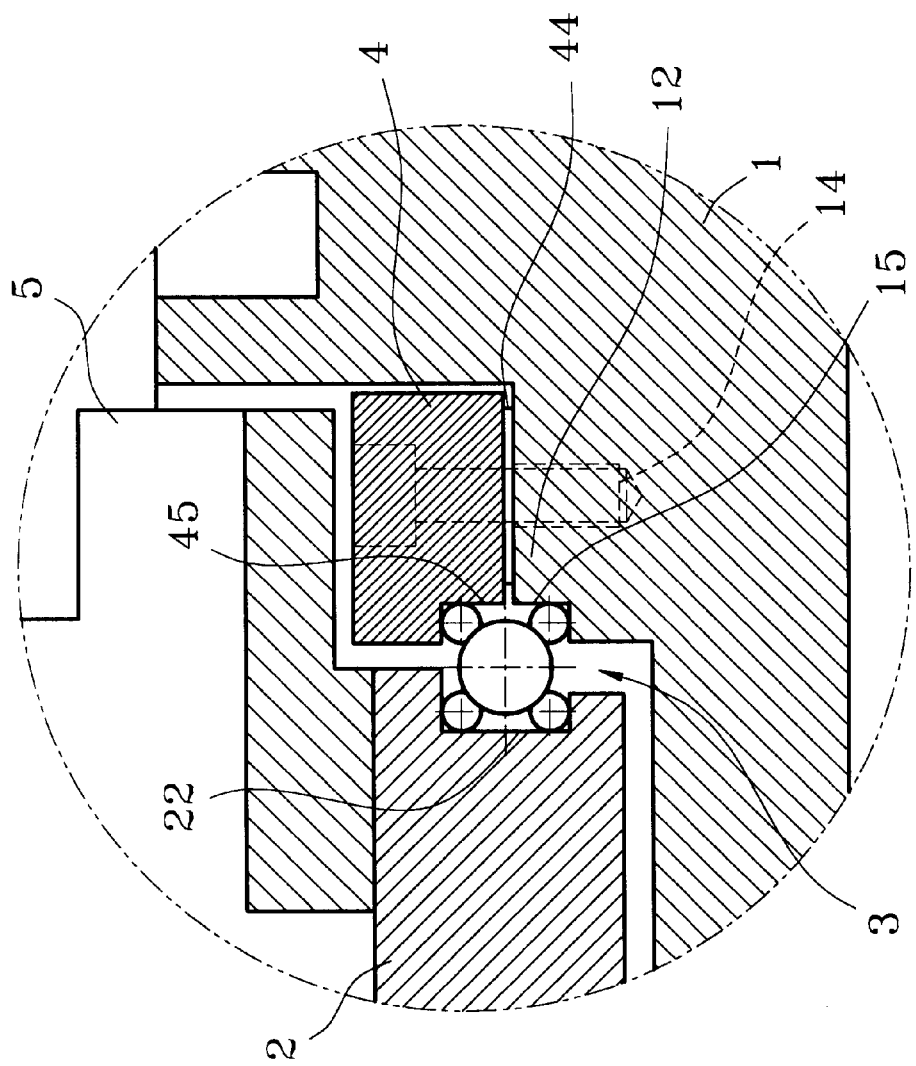
FIG. 1 is a fragmentary schematic view of a transmission mechanism of a conventional circular knitting machine.
Figure 2:
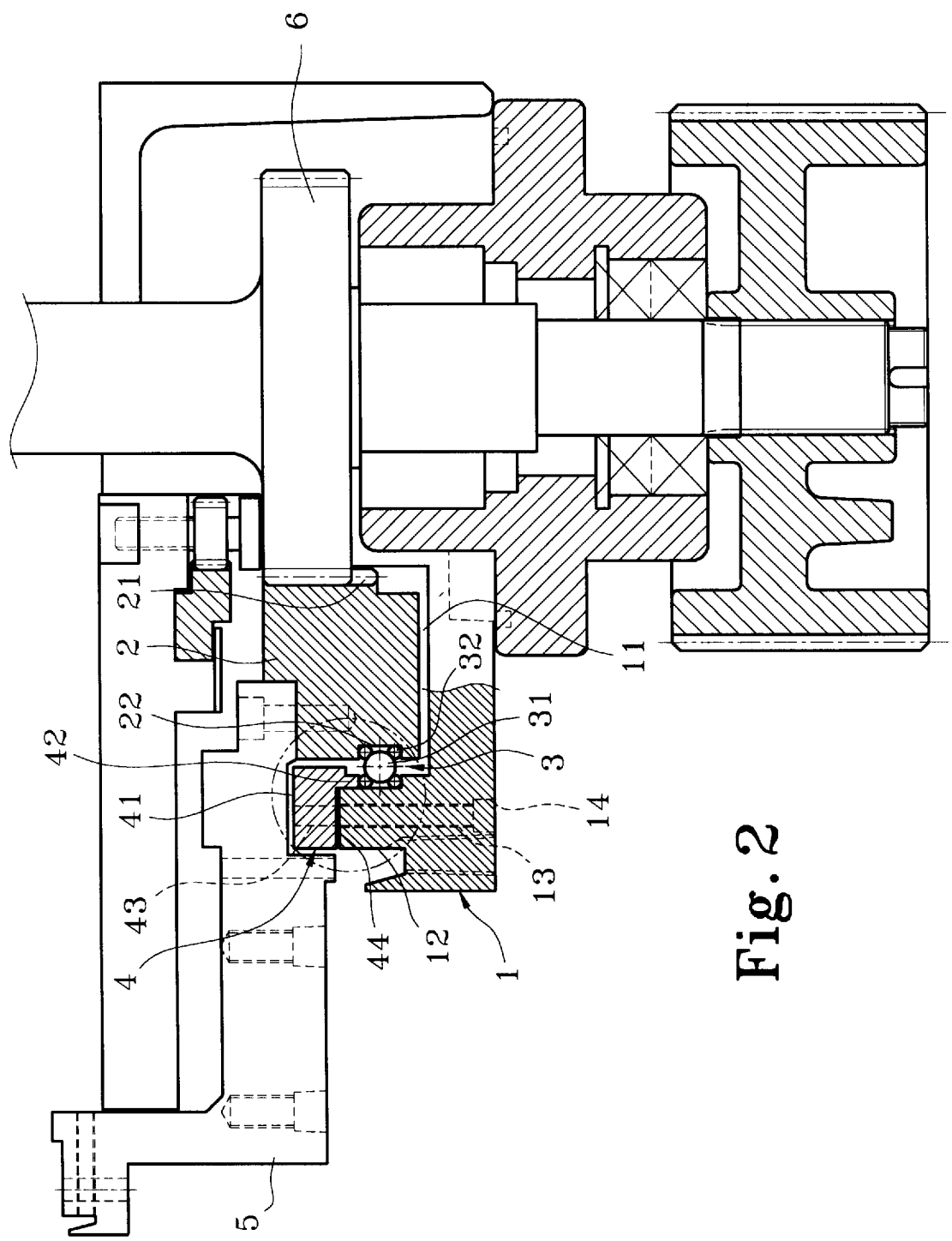
FIG. 2 is a schematic sectional view of a transmission mechanism of this invention.

Referring to FIG. 2, this invention aims at providing an improved press ring adjustment structure to couple with the steel ring at the transmission mechanism of a circular knitting machine for adjusting the wearing of the steel ring to ensure normal operation of the circular knitting machine.

The transmission mechanism set forth above mainly includes a frame 1, a lower transmission gear 2, a steel ring set 3, a press ring 4, a needle drum seat 5 and a spindle 6. The spindle 6 is located in the frame 1 which has an action zone 11 and a bulged ring 12 extended from one side of the action zone 11. In the bulged ring 12, there is a through bore 13 which engages with an adjustment element 14. There is a first recess 15 formed between the action zone 11 and bulged ring 12. The lower transmission gear 2 is located in the action zone 11 and has one side engaged with the gear 21 of the spindle 6 and another side has a second recess 22.

The steel ring set 3 includes a first ring 31 which has a larger diameter and a plurality of second rings 32 which has a smaller diameter. The steel ring set 3 is located between the first and second recesses 15 and 22 to function as a bearing while transmitting rotation from the spindle 6 to the lower transmission gear 2 and for the lower transmission gear 2 rotating in the action zone 11.

The press ring 4 is located above the bulged ring 12 and has an annular ring 41 which has one end extended into the recesses 15 and 22 to form a collar section 42 to press the steel ring set 3 to ensure that the steel ring set 3 won't get loose when the circular knitting machine is running. Another end of the annular ring 41 forms a fastening section 43 engageable with the adjustment element 14. There is a washer 44 located between the annular ring 41 and bulged ring 12 for controlling the pressing displacement of the press ring 4 against the steel ring set 3 to enable the circular knitting machine function normally.

The needle drum seat 5 has one end fastened to the lower transmission gear 2 and may rotate when driven by the spindle 6 through the lower transmission gear 2 thereby the needle drum (not shown in the figure) located on the needle drum seat 5 will also rotate. Coupled with the cam, the knitting needles will be raised or lowered to perform knitting operation.

Figure 3:
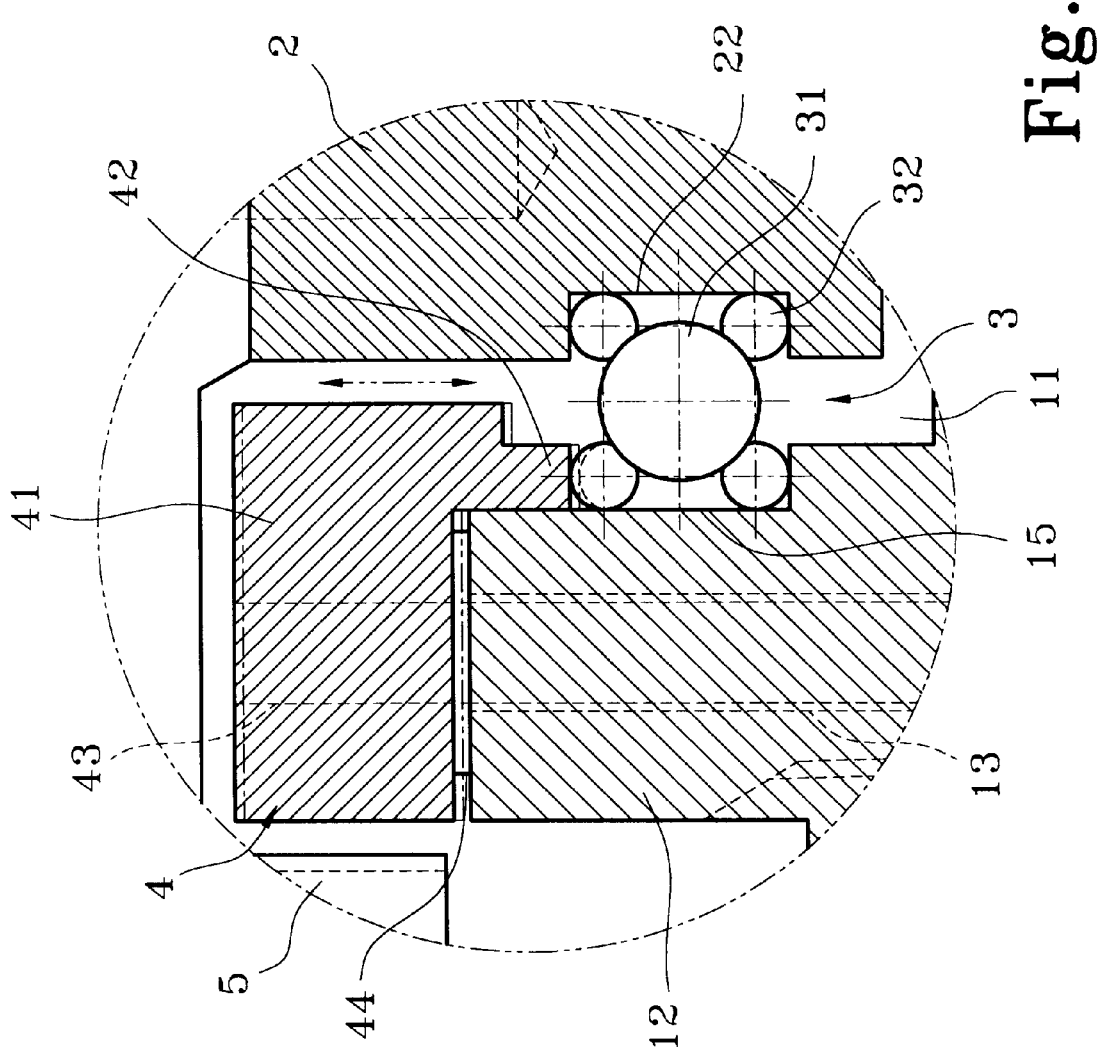
FIG. 3 is a fragmentary sectional view of this invention, showing adjustment of the press ring and steel ring set.

Referring to FIGS. 2 and 3, when the spindle 6 rotates, the lower transmission gear 2 is turned in the action zone 11 through the steel ring set 3, and consequently drives the needle drum seat 5 rotating to raise or lower the needles. After the lower transmission gear 2 being driven by the spindle 6 to operate for a period of time, the first and second steel rings 31 and 32 will become smaller because of wearing and will result in a gap between the steel ring 3 and the first and second recesses 15 and 22. As a result, the rotation of the lower transmission gear 2 becomes unstable and will generate vibration and noise and damage the transmission mechanism of the knitting machine. To prevent this problem from happening, the adjustment element 14 may be unfastened to release the downward pressure of the press ring 4, then remove the existing washer 44 and replace it with a new and thinner washer 44 between the annular ring 41 and bulged ring 12. Then fasten the adjustment element 14 again to enable the collar section 42 of the press ring 4 exerting a downward pressure on the steel ring set 3 and eliminate the gap between the steel ring set 3 and the first and second recesses 15 and 22. After the replacement and adjustment, the spindle 6 may drive the lower transmission gear 2 for the circular knitting machine to resume normal operation without vibration or noise.

The washer 44 may be made in a number of different thickness for replacement use depending on the wearing degree of the steel ring set 3. The repairs and maintenance of the circular knitting machine also may be done easier and more rapidly.

It may thus be seen that the objects of the present invention set forth herein, as well as those made apparent from the foregoing description, are efficiently attained. While the preferred embodiment of the invention have been set forth for purpose of disclosure, it would be obvious to those skilled in the art that various other changes and modifications can be made according to the embodiment. Accordingly, the appended claims are intended to cover all embodiments which do not depart from the spirit and scope of the invention.

What is claimed is:

1. An adjustment structure of press ring and steel ring of a transmission mechanism for a circular knitting machine, comprising:

a frame coupled with a spindle having an action zone and a bulged ring, and a first recess formed between the action zone and the bulged ring, the bulged ring being extended from one side of the action zone and having a through bore formed therein engaged with an adjustment element;

a lower transmission gear located in the action zone having one side engageable with the spindle and another side formed a second recess;

a steel ring set located in the first and second recess;

a needle drum seat fastened to the lower transmission gear; and a press ring located above the bulged ring having an annular ring which has one end extended into the first and second recess forming a collar section to press the steel ring set and another end formed a fastening section engageable with the adjustment element, and a washer located between the annular ring and bulged ring;

wherein the press ring is movable by the adjustment element to release pressure of the collar section on the steel ring set for the washer be removed and replaced by aother washer whereby to eliminate gaps formed between the worn steel ring set and the first and second recess to enable the transmission mechanism function normally.

2. The adjustment structure of claim 1, wherein the washer includes a plurality of pieces which have different thickness.

* * * * *